United States Patent
Powers et al.

(10) Patent No.: US 10,829,245 B2
(45) Date of Patent: Nov. 10, 2020

(54) APPARATUS FOR VEHICLE LAUNCH, RECOVERY, STORAGE AND TRANSPORT

(71) Applicant: Masten Space Systems, Inc., Mojave, CA (US)

(72) Inventors: Jonathan Yeong Seok Powers, Lancaster, CA (US); David Masten, Tehachapi, CA (US); Reuben Alexander Garcia, California City, CA (US); Joel Scotkin, New York, NY (US)

(73) Assignee: Masten Space Systems, Inc., Mojave, CA (US)

( * ) Notice: Subject to any disclaimer, the term of this patent is extended or adjusted under 35 U.S.C. 154(b) by 339 days.

(21) Appl. No.: 15/715,520

(22) Filed: Sep. 26, 2017

(65) Prior Publication Data
US 2018/0162553 A1   Jun. 14, 2018

Related U.S. Application Data (60) Provisional application No. 62/400,549, filed on Sep. 27, 2016.

(51) Int. Cl.
| | |
|---|---|
| *B64F 1/00* | (2006.01) |
| *B64G 1/62* | (2006.01) |
| *B64G 1/00* | (2006.01) |
| *B64G 5/00* | (2006.01) |
| *B64F 1/04* | (2006.01) |

(52) U.S. Cl.
CPC ............... *B64F 1/00* (2013.01); *B64F 1/04* (2013.01); *B64G 1/002* (2013.01); *B64G 1/62* (2013.01); *B64G 5/00* (2013.01)

(58) Field of Classification Search
CPC ... B64F 1/00; B64F 1/04; B64G 1/002; B64G 1/62; B64G 5/00
See application file for complete search history.

(56) References Cited

U.S. PATENT DOCUMENTS

| | | | | |
|---|---|---|---|---|
| 4,391,377 A | * | 7/1983 | Ziaylek, Jr. | A47B 81/007 206/443 |
| 5,842,667 A | * | 12/1998 | Jones | B64C 29/0025 244/114 R |
| 5,927,653 A | * | 7/1999 | Mueller | B64G 1/14 244/138 R |
| 8,955,800 B2 | * | 2/2015 | McGeer | B64F 1/02 244/110 E |
| 2015/0096485 A1 | * | 4/2015 | Morice, III | B63B 27/10 114/259 |
| 2016/0311556 A1 | * | 10/2016 | Knudsen | B64G 5/00 |

* cited by examiner

*Primary Examiner* — Rodney A Bonnette
(74) *Attorney, Agent, or Firm* — Nixon Peabody LLP (57) ABSTRACT

An apparatus for launching, recovering, transporting, and storing vehicles is disclosed. The apparatus stabilizes the vehicle while it is in operation or inactive and has a frame connected to at least one stabilizer. In certain configurations, the apparatus stabilizes the vehicle without using the vehicle's onboard landing gear. The apparatus may also include at least one pad connected to the apparatus.

16 Claims, 4 Drawing Sheets

APPARATUS FOR VEHICLE LAUNCH, RECOVERY, STORAGE AND TRANSPORT

CROSS REFERENCE TO RELATED APPLICATIONS

This application claims priority to U.S. Provisional Application No. 62/400,549, filed Sep. 27, 2016, titled "Apparatus for Vehicle Launch, Recovery, Storage, and Transport," the contents of which are incorporated herein by reference.

TECHNICAL FIELD

The present disclosure relates to vehicle launch, recovery, storage and transport systems, in particular such systems designed to function without utilizing a vehicle's on-board landing gear.

BACKGROUND

Many types of vehicles traditionally use some form of landing gear to takeoff, land, and taxi. Conventionally, such landing gear is permanently attached to the vehicle.

SUMMARY

However, the use of conventional landing gear increases the coefficient of drag of the vehicle, which decreases performance and efficiency. Additional landing gear-related systems and aerodynamic fairings also contribute to an undesirable increase in vehicle mass and complexity. Onboard landing gear or other landing systems, such as parachutes or streamers also add significant mass to the vehicle. Reducing vehicle mass is desirable because it improves the vehicle's performance.

Furthermore, in the event that onboard landing systems fail, the vehicle typically has no way to land safely. Ejection systems are sometimes used to preserve sensitive payloads, such as a human pilot, from vehicles damaged in such a manner, but the vehicle itself is usually heavily damaged or completely lost upon returning to the surface.

Accordingly, disclosed herein are apparatuses to assist in landing a vehicle without landing gear. For instance, a frame and stabilizer mounted to a surface on the ground is disclosed that serves as a landing cradle to catch or receive the vehicle when it lands instead of the vehicle landing on wheels, gear or using a parachute. For instance, in some examples, a rocket or aircraft may use its own guidance systems to lower itself onto the apparatus that guides the vehicle into place and then supports the weight of the vehicle for landing. Other system, methods, features, and advantages contained or implied by this disclosure will be or become apparent to one with skill in the art upon examination of the following figures and detailed description. It is intended that all such additional systems, methods, features, and advantages are included within this description, and are within the scope of the disclosure.

DETAILED DESCRIPTION

For the purposes of this disclosure, the term "vehicle" includes, but is not limited to, aerial vehicles, suborbital vehicles, and aerospace vehicles. The term "vehicle" specifically includes vertical takeoff and landing (VTOL) aircraft, aerial vehicles capable of landing and/or taking off vertically, vertical takeoff vertical landing (VTVL) launch vehicles, and aerospace vehicles capable of landing in some orientation with nearly zero lateral velocity, such as a hover landing in a horizontal vehicle orientation. The term "vehicle" also includes any portion of the aforementioned craft, including but not limited to boost stages, reentry stages, crew capsules, cargo transports, intermediate rocket stages, and payloads carried by those craft.

Overview

The disclosed apparatus comprises, in some examples, a frame connected to a surface and to at least one stabilizing portion. The surface may be the ground, a foundational structure, or other structure capable of withstanding rocket scale or aircraft exhaust forces and temperatures. The apparatus to guides and stabilizes a landing vehicle as the vehicle contacts the apparatus upon final decent. Then, the apparatus supports the weight and holds the vehicle for landing, without the vehicle using its own landing gear to touch the ground.

"Vehicles" may include a variety of vehicles, for instance: aircraft, aerial vehicles capable of landing and/or taking off vertically, VTVL suborbital launch vehicles, reusable VTVL launch vehicles, orbital launch vehicles, aerospace vehicles capable of landing in some orientation with nearly zero lateral velocity, such as a hover landing in a horizontal vehicle orientation, and other vehicles which a person having ordinary skill in the art would find the presently disclosed apparatus suitable for. For each vehicle, a differently positioned and shaped apparatus may be developed that fits and is suitable to catch and land the vehicle.

"Stabilize" means to guide, put, or keep the vehicle in or toward a desired equilibrium position. For example, in certain arrangements, the apparatus guides the vehicle toward a stationary landing position by physically contacting the vehicle with portions of the apparatus.

"Surface" refers to any suitable area that the apparatus may be mounted to or placed on top of including, but not limited to, the surface of the earth or another celestial body, the deck of a maritime vessel, a portion of a motor vehicle, a portion of an aerospace vehicle, a space-based structure, or a portion of another moveable or stationary object to which the apparatus may be mounted, such as a concrete foundation or movable platform.

Figure 1:
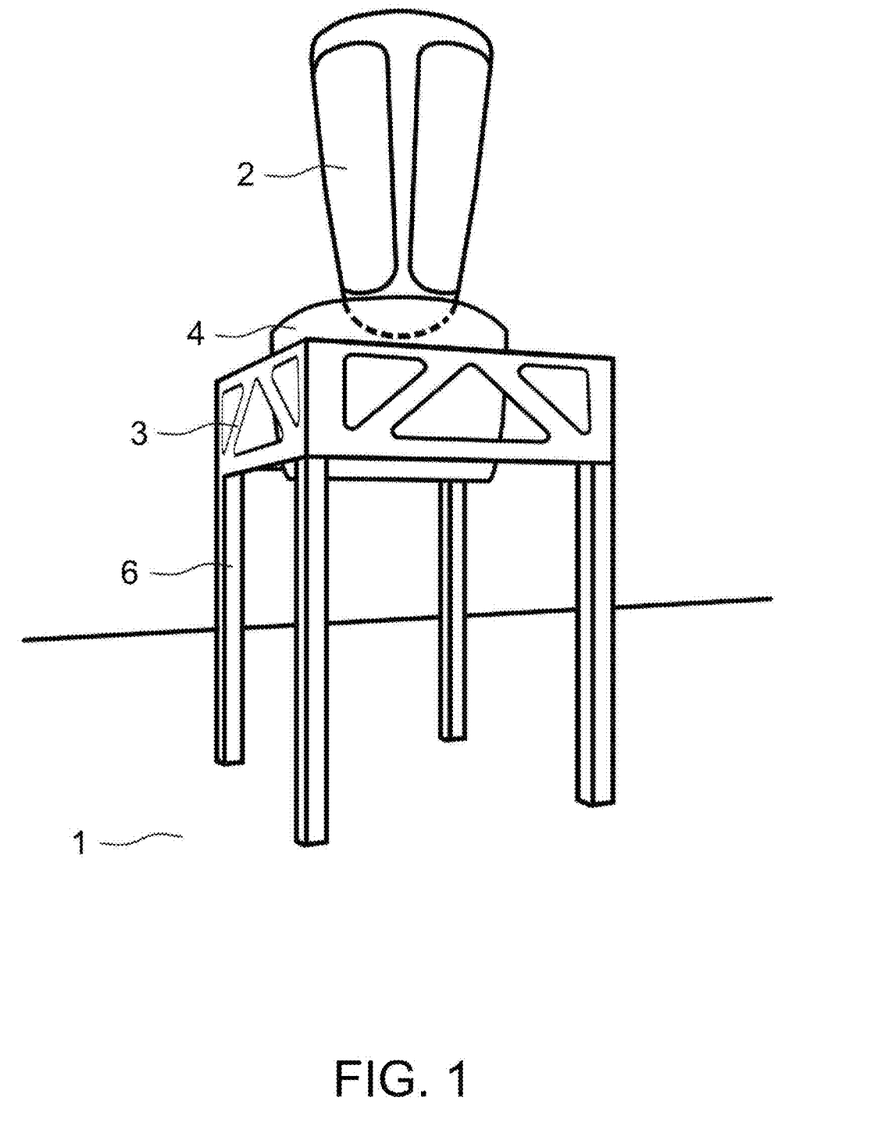
FIG. 1 is a side view of the apparatus in accordance with the present disclosure, in operation stabilizing an example VTVL rocket.

FIG. 1 is a side view of one embodiment of the apparatus connected to a surface 1 stabilizing a vehicle 2. In this embodiment, the vehicle 2 is a VTVL rocket. The frame 3 is mounted to the surface 1 and also is connected to a stabilizer 4 for stabilizing the vehicle 2.

Frame

The frame 3 is a structure that gives shape and support to additional elements of the apparatus such as stabilizers 4, allowing those elements to stabilize the vehicle 2 when those elements are in contact with the vehicle 2. The frame 3 may include substantial force resistance capability and/or flexibility along an axis parallel to the vector aligned with gravity. Accordingly, the frame 3 is constructed of a suitable shape, material, and geometry to withstand those forces and the forces from the weight of the vehicle 2 pushing outward on the frame 3. For instance, the frame 3 illustrated in FIG. 1 forms a square shaped frame that supports and connects to the stabilizer 4.

The frame 3 may be constructed from a series of metal, composite or other struts that are welded together in a truss like configuration to distribute the forces that may result from landing a vehicle 2 on the stabilizer 4 and frame 3. For instance, as illustrated in FIG. 1, the frame is constructed from rectangular elongated struts or bars that are connected to a form a box shaped frame with struts that connect the bottom corners to the top middle bars to distribute forces in a truss like manner.

The frame 3 may be permanently or removably connected to a surface 1. In particular embodiments, this connection is made by connecting (e.g. with bolts screws or welding) load bearing legs 6 to the frame 3, such as metal struts. Additionally, the load bearing legs 6 may be connected to a surface 1 (e.g. concrete or metal foundation to support the entire landing platform).

A technician may connect the frame 3 to the surface 1 using other methods, including concrete supports, placing the frame on the surface such as a concrete slab if the frame 3 is sufficiently stable. A technician may also mount the frame 3 to a mobile trailer or transportation vehicle, or connect leg portions 6 to the frame 3 and embed the leg portion in the surface 1 (e.g. concrete or ground). Legs 6 may be secured with cement sleeves if the legs 6 are embedded into the ground 1.

Other characteristics of the frame 3 are determined or constructed to complement the structural design and/or geometry of the vehicle 2. For example, if the vehicle 2 has a payload bay or other structural elements on the bottom portion of the vehicle 2 that one desires to access while the vehicle 2 is stabilized in the apparatus, then the frame 3 may include physical pieces that are arranged to avoid impeding the access.

Other vehicles 2 may expel jet or rocket engine exhaust when the vehicle's 2 engine(s) is in operation. In certain embodiments, the apparatus is designed to direct this exhaust along certain paths or to minimize the exhaust's contact with the apparatus because of the damaging effects of high-temperature exhaust.

In FIG. 1, the frame 3 is designed with openings that allow some or all of the exhaust to pass through the frame 3 during operation. For example, the center of the frame 3 may include an unobstructed path for the exhaust to flow out, and have all of the structural components forming a square, rectangle, triangle, or other shape around the exhaust path. In the embodiment depicted in FIG. 1, the frame 3 is a series of supporting members that are physically connected to one another and form a structure capable of supporting the vehicle 2. The frame 3 serves as the physical support for the stabilizer 4 with its connection to the surface 1.

The frame 3 of the apparatus is constructed of a variety of materials selected for their capacity to support the vehicle's 2 weight and withstand any forces that may be imparted upon the apparatus during its usage, including vehicle 2 transport, takeoff, landing, or storage. For instance, the frame 3 may be constructed of steel, metal, composite, epoxy or other structurally rigid struts or members. In some examples, the components or struts of the frame 3 may be welded.

Stabilizer

In certain embodiments, the frame 3 may be connected to a stabilizer 4, or structural components arranged to form a stationary or relatively stationary cradle structure that may contact, stabilize, and support the weight of the vehicle 2 during landing. Accordingly, a cradle type stabilizer 4 will be of sufficient diameter and circumference or sized so that when a rocket or other vehicle 2 lands on the stabilizer 4 the rocket will fit inside or within the stabilizer 4 and be supported and balanced upright by the stabilizer 4. Each stabilizer 4 accordingly, may constructed and balanced to the precise specifications of each rocket, or may be adjustable to accommodate the size of each vehicle 2.

For instance, if a rocket or other vehicle 2 has a circular shaped circumference that increases towards the middle, the stabilizer 4 may be shaped like a circular cradle or belt with an opening in the middle. This will allow the vehicle 2 to slide down into the stabilizer 4 during landing, so that the stabilizer 4 snuggly fits around the perimeter and supports the weight of the vehicle once it has landed.

In other embodiments, instead of a stationary stabilizer 4, the stabilizer 4 may include moveable portions that contact and stabilize the vehicle 2. In certain embodiments, these stabilizers 4 are comprised of a portion made of composite or other suitable materials, statically connected to the frame 3, configured to contact the vehicle, provide at least some stabilization, and/or support at least some of the vehicle's 2 weight.

Stabilizer Shock Absorbers

The stabilizer 4 optionally includes one or more shock absorbers 5. The shock absorbers 5 are constructed of a polymer, metal, metal alloys, plastics, ceramics, or other suitable materials, structures, devices, or combinations of materials. The shock absorbers 5 are configured to bend or compress in desired directions when the stabilizer 4 is in physical contact with the vehicle 2. A shock absorber 5 allows the stabilizer 4 to flex under forces imparted upon it without breaking. This also serves to dampen shocks caused by the operation of the vehicle's 2 engine and from the impact of the vehicle 2 during take-off and landing.

In particular configurations, the shock absorber 5 contacts the vehicle 2 during stabilization. Where this occurs, the flexibility of this portion allows it to partially conform to the vehicle's 2 shape, providing greater contact with the vehicle 2. This behavior also provides shock absorption.

The shock absorber 5 may be comprised of a variety of shock absorbing devices, such as a compressible layer, pneumatic or hydraulic shock absorber, coil or torsion spring, suitable for cushioning or absorbing shocks from vehicle takeoff, landing, transport, storage, other environments, and other transient forces.

Depending on the configuration of the apparatus, the shock absorbers 5 may be attached to the interior portion of the stabilizer 4, where the interior portion is defined as being on the same side of the stabilizer 4 as the part of the stabilizer 4 that contacts the vehicle 2.

In certain configurations, the shock absorber 5 is rotationally connected to the stabilizer 4 using a hinge, ball joint, or other suitable device that allows the shock absorber 5 to rotate in one or more axes with respect to the interior surface of the stabilizer 4. In other embodiments, the shock absorbers 5 are connected to the stabilizer 4 in a manner that allows the shock absorber 5 to move in one or more axes relative to the surface of the stabilizer 4 the shock absorber is attached to.

This is accomplished by mounting the shock absorber 5 to a worm gear, sliding rail, hydraulic piston, or other suitable device that allows the shock absorber 5 to move in the described manner.

The shock absorbers 5 may experience inclement environments created by the vehicle's 2 exhaust, intermittent shocks caused by high velocity landings, forces from take-off, or other forces. In these configurations, the shock absorber 5 is configured to withstand such forces and be readily refurbished or replaced.

In particular embodiments, the shock absorber 5 is a compressible layer such as rubber mounted to the inner circumference of a stabilizer that is shaped as a cradle. Accordingly, in this configuration, the vehicle 3 will contact the shock absorber 5 will be supported by the stabilizer 4 and frame 3.

In some embodiments, the shock absorber 5 is a plate and tensioner arrangement where the shock absorber 5 is mounted on one end to a stabilizer 4, or frame 3 and the shock absorber 5 is configured to come into contact with the vehicle 2 on the other end. In other embodiments, the shock absorber 5 is a pneumatic or hydraulic shock absorber or a coil or torsion spring.

The shock absorber 5 may be configured to attach to the stabilizer 4 at the connection point on one end portion and to the frame 3 at the other end portion, in some configurations. In this arrangement, the shock absorber 5 may not physically contact the vehicle 2. Rather, it absorbs shocks transmitted through the stabilizer 4 it is attached to.

The apparatus includes shock absorbing devices at other locations in certain embodiments.

In certain configurations, the shock absorbers 5 are integrated into the legs 6 of the frame 3 and do not physically contact the vehicle 2. In other embodiments, stabilizing guide pins include shock absorbing devices 5 which are chosen to chosen to absorb shocks from the stabilizing guide pin coming into contact with the stabilizer 4 or frame 3. The stabilizer 4 may contact the vehicle 2 via a connection to pads. In some embodiments, these pads have inner contours that match the outer contour of the vehicle 2 where they contact the vehicle 2.

In certain configurations, the stabilizer 4 is connected to the frame 3 by a device such as a bearing(s), ball joint, or hinge which allows the stabilizing portion to rotate freely. In certain embodiments, the stabilizer 4 rotates about a vertical axis or within a horizontal plane. In other embodiments, movement of the stabilizer 4 occurs in other directions apart from and/or in addition to the previously defined directions.

Stabilizer Guide Pins

Figure 4:
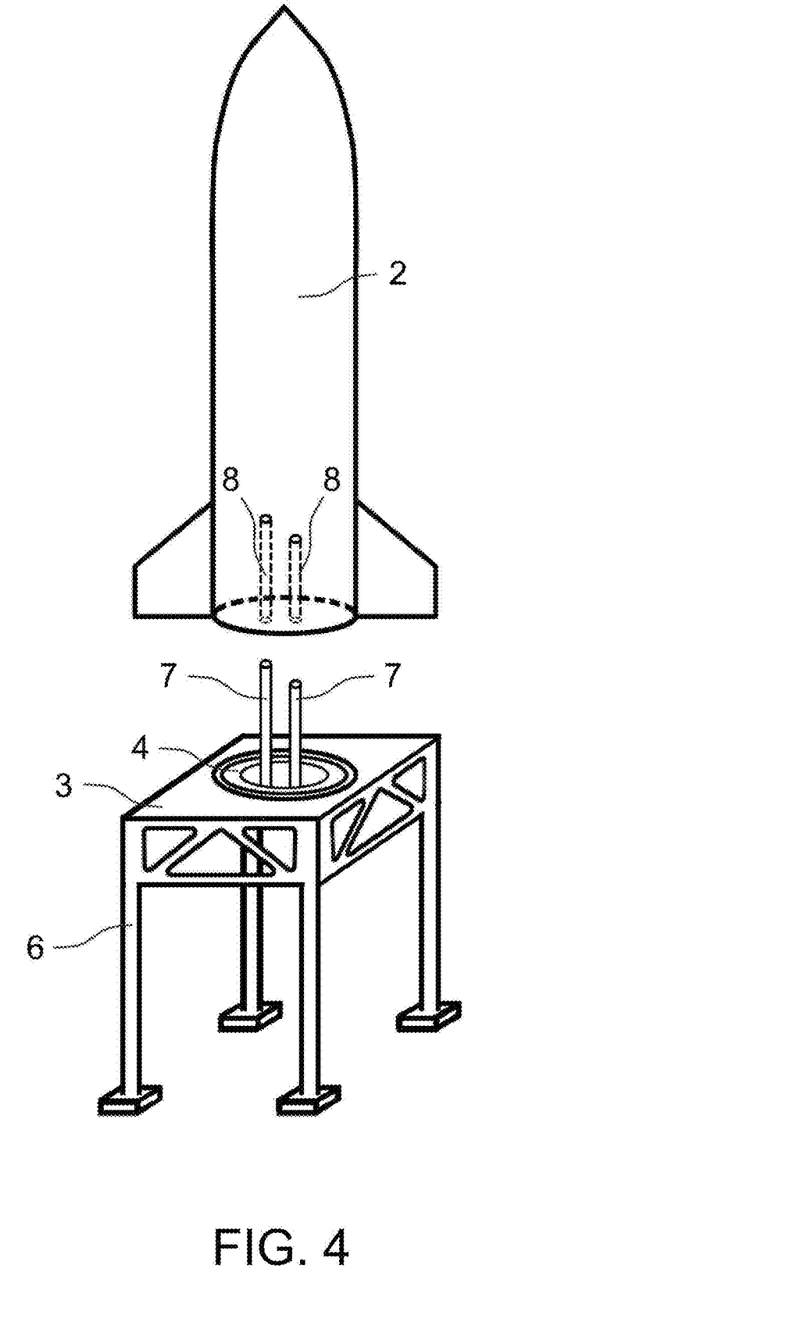
FIG. 4 is a side view of an apparatus in accordance with the present disclosure, depicting a stabilizer with guide pins and a vehicle with complementary receiving slots.

In some embodiments, stabilizer 4 includes guide pins that are complementary to receiving slots on the vehicle 2. FIG. 4 illustrates a stabilizer with guide pins 7 and a vehicle 2 with complementary receiving slots 8. The guide pins 7 direct the vehicle 2 onto the stabilizer 4 as the vehicle 2 is lowered down onto the guide pins 7. In some examples, a shock absorber 5 may be utilized with the guide pins 7 so that guide pins have a spring or other pressure absorbing device that will give when the vehicle slots 8 contact the pins 7. Also, the stabilizer 4 may also include a flat portion that the base of the vehicle 2 rests upon or applies the majority of its weight to during landing and the guide pins 7 may only provide guidance to position the vehicle 2.

The guide pins may be constructed of materials used in the frame 3, where such materials are sufficiently strong to withstand the forces exerted from the vehicle 2 landing on the stabilizer guide pins. In some embodiments, the guide pins 7 are constructed of polymers. In other embodiments, the guide pins 7 constructed of metal or metal alloys.

In some embodiments, the guide pins 7 are statically connected to the frame 3 and protrude through the stabilizer 4 to receive the vehicle 2. Accordingly, in this example, the guide pins 7 allow the vehicle 2 base to settle below the stabilizer 4 to the level of the frame 3, while the stabilizer 4 grips or cradles the vehicle 2 higher on the fuselage or body of the vehicle 2. In other embodiments, an end portion of the guide pin 7 is positioned to physically contact the stabilizer 4, restricting the descending or ascending vehicle's 2 range of motion and stopping the base of the vehicle 2 at the stabilizer 4.

In other configurations, the connection between the frame 3 and the guide pin 7 is dynamic, allowing the guide pin 7 to be moved to a location that cannot restrict the range of motion of the stabilizer 4. This is accomplished by connecting the guide pin 7 to the frame 3 via a hinge, which is configured to allow the guide pin 7 to be moved out of the range of motion of the stabilizer 4.

In other embodiments, the dynamic connection between the guide pin 7 and the frame 3 is a pin connection or similar means that allows the guide pin 7 to be moved out of the range of motion of the stabilizer 4.

In some examples, the stabilizer has portions (e.g. sidewalls) that may be opened to allow for a greater target area for landing or allow for more freedom once a vehicle 2 has launched. In some examples, the position of the stabilizer 4 is maintained by the frame 3. This open position is configured to form a larger flight area for the vehicle 2 to operate in during operations when some part of the vehicle 2 is within the inverted frustum.

In these examples, movement of the stabilizer 4 may be pneumatically, physically, or electronically controlled. In particular, embodiments where the motion is physically controlled, the frame 3 is configured to provide or further comprises a physical stop in some or all directions that the stabilizer 4 is designed to rotate in.

For example, where the stabilizer 4 rotates in a plane defined by the stabilizing portion's connection point with the frame 3 and a line extending tangential from the surface 1 through some interior point within the frame 3, the frame 3 further comprises stop pins, which lie in the same plane. These stop pins prevent the stabilizer 4 from moving beyond the point where the stabilizer 4 comes into contact with the stop pin. In an example apparatus, the frame 3 is configured to inhibit the stabilizing portion's 4 range of motion without the need of stop pins. This is accomplished by configuring portions of the frame 3 to lie in the plane of movement of the stabilizer 4. Here, the frame 3 is configured to withstand forces created by the stabilizer 4 contacting the frame 3.

In other embodiments, the moveable portions of the stabilizer 4 are electronically controlled. The electronically controlled motion control unit replaces the above described spring-based unit in both function and location in particular embodiments. The electronically controlled device is a linear actuator, a hydraulic ram, a pneumatic ram, a gear-driven actuator, or similar device that allows electronic control of the stabilizer 4.

In other embodiments, the stabilizer 4 is controlled in part by a physical device and in part by an electronic device. In certain configurations, the linear actuator has sufficient power to move the vehicle 2 while it is in at least partial contact with the stabilizer 4 or being stabilized by the apparatus. In other embodiments, the electronic control device manipulates the position of the stabilizer 4 in directions that the physical control device does not act upon the stabilizer 4. The electronic control device is connected on one end to the stabilizer 4 and on another end to some static portion of the apparatus or to the surface 1 in other configurations. In particular embodiments, the electronic control device is connected to the stabilizer 4 at a point far from the physical control device's connection point.

In other embodiments, utilizing physical and electronic control devices, these devices have the same connection point on the stabilizer 4 on one end portion and/or have the same connection point on their other end portion(s). In some of these configurations, one type of control device is located inside the other control device. For example, in one embodiment, the electronic control device comprises a hydraulic ram and the physical control device comprises a tensioner. The hydraulic ram is placed inside the tensioner, connecting to the stabilizer 4 at the same point the tensioner connects. In other embodiments, the control devices do not have this coextensive configuration.

In embodiments that utilize electronically controlled devices to move portions of the apparatus, a computer is used to control the electronically controlled devices. This computer is configured to allow manual control of the apparatus or is programmed to manipulate the apparatus based on data from preprogrammed flight profiles and/or data from the vehicle. Such data includes but is not limited to the position, velocity, and orientation of the vehicle, the operational status of the vehicle, communications status, system functionality, and vehicle system response and performance. Such electronic control allows the apparatus to recover or contain the vehicle in the event of a systems failure during takeoff or landing.

Mobile Frame

Depending on the application, the frame 3 may include legs that assist in moving the landing pad after the vehicle 2 has landed in it which alter the vehicle's 2 location in the apparatus when the vehicle 2 ceases operation. This may be desirable in order to provide a stabilizer 4 for the vehicle 2 or to avoid ground effects caused by the vehicle's 2 exhaust as it lands or takes off. In particular embodiments, avoiding such ground effects is accomplished by increasing the length of the legs 7 so that the exhaust has enough distance from the base exiting the vehicle 2 to the ground so it does not reflect back up strongly enough to damage the vehicle 2 or apparatus.

Certain vehicles 2 which the apparatus stabilizes are powered by jet or rocket engines. These engines create large amounts of concentrated, hot gases that damage or destroy certain kinds of materials they come into contact with, such as wood or plastic. For apparatuses designed to stabilize rocket or jet-powered vehicles where the exhaust of the vehicle 2 may come into contact with the apparatus, the apparatus is at least partially constructed of materials that withstand contact with such exhaust. For instance, metal, metal alloys, ceramics, actively-cooled materials, or other suitable materials are used in such configurations.

Landing Processes

In specific embodiments of this apparatus, the elements of the apparatus are arranged such that they guide the vehicle 2 toward a specific landing location through physical contact with the apparatus. This allows the vehicle 2 to land safely without independently guiding itself to the specified landing location. Among other reasons, this is advantageous because it provides the vehicle 2 the ability to safely land in non-optimal conditions for example, as a result of inclement weather or due to technical or pilot impediments or failures.

Other examples of this apparatus are configured such that their elements at least partially contain the vehicle 2 in the event of a vehicle 2 systems failure while the vehicle 2 is within the interior volume of the apparatus, as defined by its stabilizing portions and additional elements connected to these elements, such as structural rings, frames, or wire mesh removably or permanently attached to restrain debris. Such configurations are designed to limit the spread of debris if the vehicle 2 fails while it is within or near the apparatus.

Figure 2:
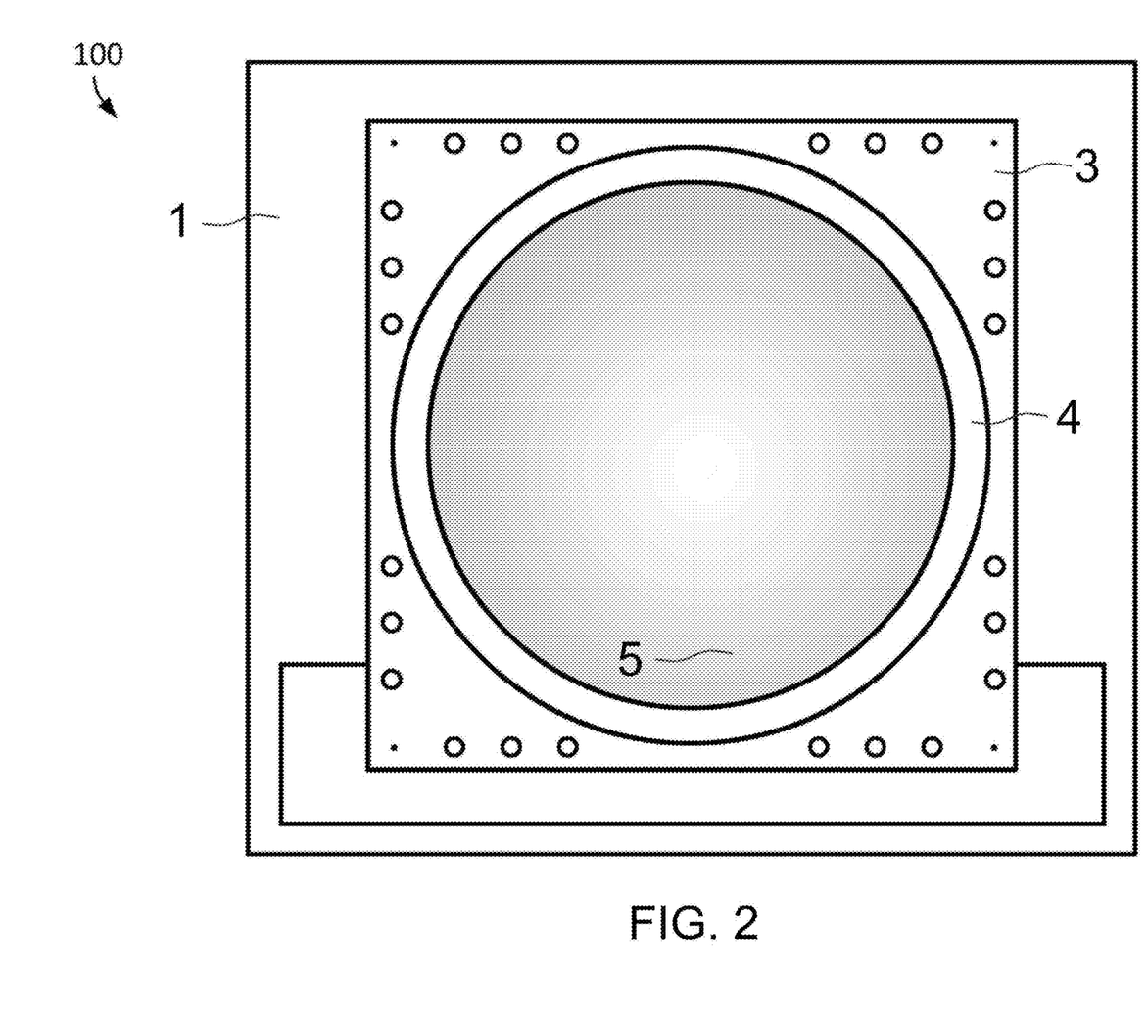
FIG. 2 is a top view of the apparatus in accordance with the present disclosure, depicting the apparatus without a vehicle present.

FIG. 2 is a top view of a landing platform that illustrates the stabilizer 4 attached to a frame 3. In this example, the stabilizer 4 is shaped like an inverted frustum to conform to the geometry of a vehicle 2 (e.g. rocket) that has a spherical cross section that tapers down to a flat or relatively flat surface where the nozzle or other rocket engine exhaust is located. For instance, the bottom of the stabilizer 4 (closest to the frame) may have a circular cross section with a radius that is smaller than the radius at the top of the stabilizer 4. Accordingly, the sidewalls of the stabilizer 4 may radiate inward as they approach the bottom of the stabilizer 4 towards the surface 1, where the bottom or base of the stabilizer is connected to the frame.

Additionally, a frustum shaped shock absorber 5 may be inserted inside the frustum to absorb the shock from a vehicle 2 setting down inside the stabilizer 4 and contacting the shock absorber 4.

The stabilizing portion 4 combined with the frame 3 form a structure with will at least partially contain debris from the vehicle 2 in the event that the vehicle 2 fails while in or around the frustum volume.

For certain configurations, the shock absorber 5 comprises at least one pad 5 connected to the stabilizer 4 that comes into contact with the vehicle 2. The pad 5 provides a larger contact area with the vehicle 2 that, among other things, aids in stabilizing the vehicle 2 while the apparatus and vehicle 2 are in at least partial contact. The pads 5 are attached to the stabilizer 4 using adhesive, screws, welding, or other connection methods. These stabilizer 4 and shock absorbing pads 5 are configured to stabilize the vehicle 2 when they come into contact with the vehicle 2. In one embodiment, the inner contour of the pads 5 are approximately the same as a portion of the outer contour of the vehicle 2 such that the pad 5 contacts the vehicle 2 in an approximately form-fitting fashion during at least some portion of the time it is stabilizing the vehicle 2.

The shock absorbing device 5 may also include other shock absorbers connected to the pad 5 or separate from the pad 5 as disclosed herein, in order to avoid damaging the vehicle as it is in contact with the pad, to provide cushioning forces, and to reduce forces experienced by the vehicle or the apparatus. For instance, the pad 5 may be connected to the stabilizer 5 with springs, shocks, etc. In particular embodiments, the pad may be rotationally connected to the stabilizer 4, or the stabilizer may be rotationally connected to the frame 3, or the frame 3 may be rotationally connected to the surface 1. This rotational connection is a hinge, ball-joint, canfield joint, an electronically controlled actuator, or some other rotational connection in certain embodiments and absorbs rotational energy transmitted during landing.

As shown in FIG. 2, in certain embodiments, the perimeter of the inner surface of the stabilizer 4 resembles a cross section of the vehicle the apparatus is configured to stabilize. For instance, the inner diameter of the stabilizer 4 may decrease moving from the top to bottom towards the surface 1. Additionally, the stabilizer 4 may comprise substantially the same area as a cross section of the vehicle 2 where the vehicle's 2 stationary landing position is located on the apparatus.

In certain embodiments, the apparatus is configured to allow the stabilizer 4 to move to an open position to receive the vehicle 2 such as a vehicle 2 or an aircraft when the vehicle is not in contact with the apparatus. Among other things, this creates a larger area for the vehicle 2 to enter as it beginning its landing maneuvers. In specific embodiments, there is a plurality of stabilizers 4, at least some of which can move to a position that creates a larger area for the vehicle 2 to enter as it is beginning its landing maneuvers, during launch, or otherwise being removed from contact with the apparatus. In specific embodiments, this is accomplished by choosing stabilizers 4 whose upper portions or sidewalls move to locations which create the frustum of a cone which has an upper cross section of greater area than the cross section located closer to the surface 1. Accordingly, once the vehicle 2 contacts the stabilizer 4, the stabilizer 4 may be collapsed, compressed, strapped, or otherwise decrease in size to more tightly fit and stabilize the vehicle 2 once landed.

Figure 3:
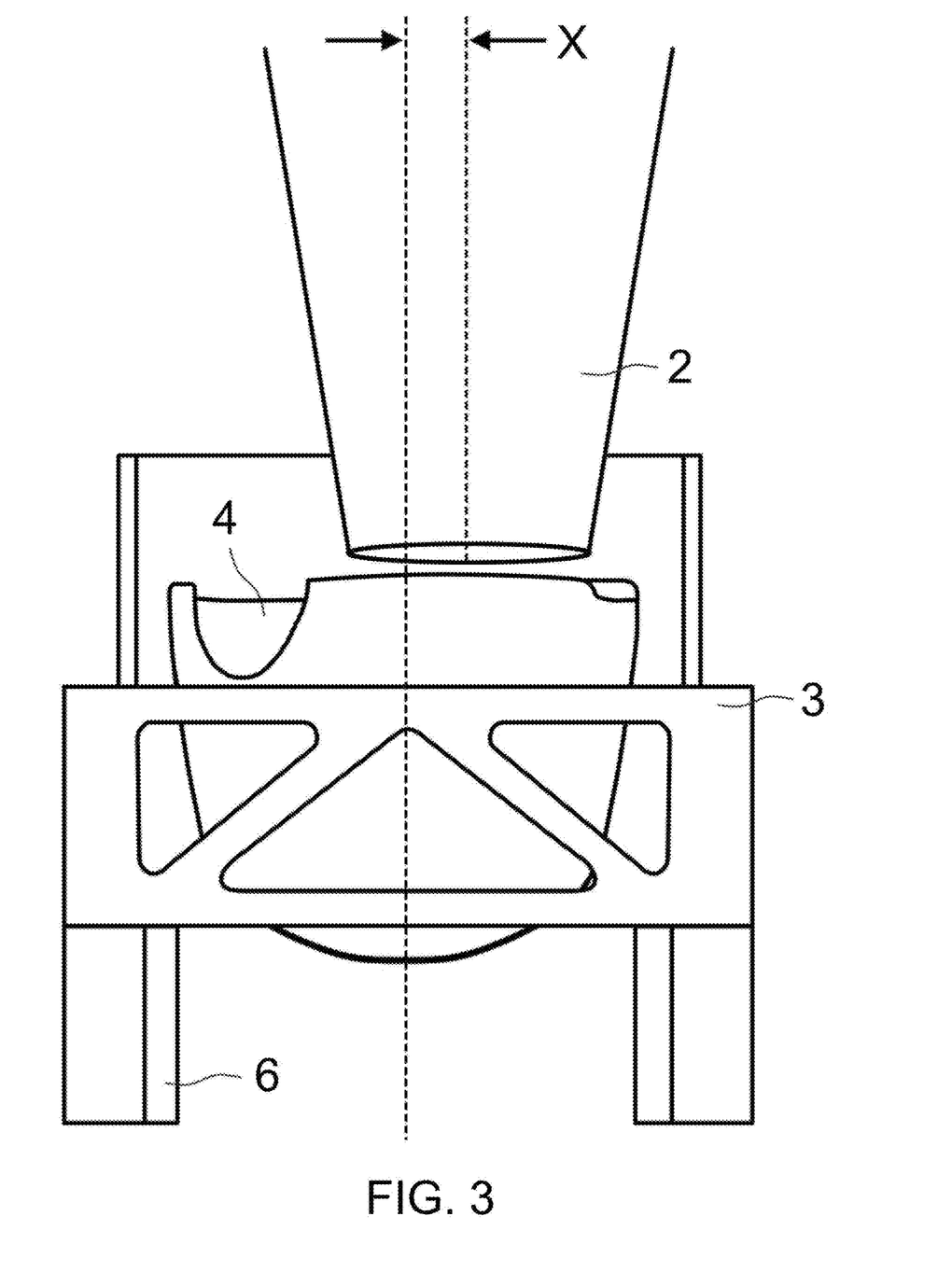
FIG. 3 is a side view of the apparatus in accordance with the present disclosure, depicting a vehicle landing in the apparatus off center by a distance X (e.g. 0.102 m).

FIG. 3 illustrates a side view of a vehicle 2 as it is landing in the stabilizer 4 connected to the frame 3. As illustrated, the vehicle 2 is landing off center by a distance X (e.g. 0.102 m). Accordingly, once the vehicle 2 contacts the stabilizer 4, the stabilizer 4 (and potential shock absorber 5 not illustrated here) may guide the vehicle 2 to the center as it descends into the stabilizer 4. Accordingly, because the sidewalls of the stabilizer 4 are sloped and form a decreasing diameter towards the bottom of the stabilizer 4, the vehicle will be smoothly guided into the frustum of the stabilizer 4 in this example.

Testing Restraining Device

In some examples, the apparatus can be utilized to perform static testing of the vehicle's 2 systems, including engine testing, by restraining the vehicle 2 with chains connected to mounting brackets on the surface 1 on one end and to mounting points located on the vehicle 2 at the other end of the chain.

The apparatus may impede the motion of the vehicle 2 by the addition of the physical restraints connected to the vehicle 2 during engine operation, which is desirable because it allows the performance of static engine firings to evaluate engine performance.

Other configurations utilize different devices for impeding the vehicle's 2 motion. In one embodiment, the frame 3 further comprises static connection points through which a rigid guide pin may pass. The static connection points are positioned such that when the stabilizer 4 is stabilizing the vehicle 2 while the vehicle 2 is not in operation, the rigid guide pin may be removably inserted through static connection point on the frame 3 and impede the movement of the stabilizer 4 with respect to the frame 3. In particular embodiments, the static connection point is two metal braces positioned on either side of the stabilizer 4, such that the rigid guide pin may be inserted through the metal braces in a manner that places the rigid guide pin across the stabilizer 4, preventing the stabilizer's 4 movement with respect to the frame 3.

In another embodiment, the rigid guide pin may also prevent the stabilizer 4 from moving with respect to the frame 3, if the stabilizer 4 has certain degrees of freedom based on the joints or connections utilized. For instance, if the guide pin is removably connected to the static connection point of the frame 3, and inserted through an opening or slot in the stabilizer 4, the guide pin can impede motion (e.g. rotational) of the stabilizer 5. In these embodiments, the force of the guide pin against the vehicle 2 prevents it from moving. In other embodiments where the stabilizer 4 is used as a motion impeding device, an additional portion is removably attached, such as a ring, net, straps, wire, or chain, which is connected to both the vehicle 2 and the stabilizer 4.

In certain embodiments, the apparatus further comprises a restraining mechanism such as a chain removably connected to the vehicle 2 at one end and removably connected to a static object such as the frame 3 of the apparatus or the surface 1 which enable the vehicle's 2 engines to be fired without the vehicle 2 leaving the apparatus, enabling engine testing or testing of other vehicle 2 systems and performance. In other embodiments, the chains are removably attached to the surface 1 via ground connection points or the moveable portions of the apparatus. Other restraining mechanisms, such as metal struts, rope, or metal frames are removably attached to the vehicle 2 and the apparatus in order to restrain the vehicle during such testing, instead of using chains.

Another configuration which enables the vehicle's 2 engines to be fired without the vehicle leaving the apparatus further comprises a restraining mechanism in the form of a rigid ring. This ring may be placed around the vehicle 2 at some position. It can be removably attached to the vehicle or it rests on the vehicle 2 without slipping because its inner circumference is smaller than the circumference of the vehicle 2. This ring may be removably attached connected to a static object such as the frame 3 of the apparatus or the surface 1.

In some examples, the apparatus may be mounted on a mobile unit (e.g. truck), such as, a truck. Where the apparatus is mounted on a mobile unit, the vehicle 2 optionally further comprises mechanisms to steady the mobile unit while the vehicle 2 is taking off or landings. Example mechanisms include retractable stabilizing feet.

Aircraft Stabilizer

In another embodiment, the apparatus is designed to stabilize an aircraft wherein the portion of the aircraft that contacts the apparatus has a significantly smaller cross section than the rest of the aircraft. For example, an airplane's fuselage may have a smaller cross section than the portions of the airplane that include the wings. An apparatus configured to stabilize such an aircraft has an inner surface perimeter that resembles the cross section of the airplane's fuselage. The inner surface is defined by stabilizing components whose end portions lie in the same plane, parallel to the surface. The vertical distance between the plane defined by the end portions of the stabilizing components and the lowest point of the stationary landing portion is less than the vertical distance between the bottom of the airplane's fuselage and the bottom of the airplane's wings, so the airplane can be stabilized in the apparatus while not in operation while only contacting the apparatus with its fuselage.

The foregoing is offered primarily for descriptive purposes. Further variations and modifications that utilize the features disclosed herein and therefore fall within the scope of this disclosure will readily occur to a person having ordinary skill in the art.

The invention claimed is:
1. An apparatus for stabilizing vehicles comprising:
a frame positioned on the surface and
a stabilizer connected to the frame and stabilizer being configured to stabilize a vehicle while in at least partial contact with the vehicle while the vehicle is stationary or in motion, wherein the frame is welded to the stabilizer with a steel plate.

2. The apparatus of claim 1, wherein the connection between the stabilizer and the frame is positioned to allow the stabilizer to move to an open position to receive the vehicle when the vehicle is not in at least partial contact with the stabilizer.

3. The apparatus of claim 1, wherein the stabilizer is connected to a shock absorber.

4. The apparatus of claim 3, wherein the shock absorber is a pad.

5. The apparatus of claim 1, wherein the stabilizer is a cradle structure.

6. The apparatus of claim 5, wherein the cradle structure is shaped in an inverted frustum.

7. The apparatus of claim 1, wherein the vehicle is a rocket with a body having a circular circular cross section.

8. The apparatus of claim 1, wherein the frame is a constructed of steel struts that form a box shaped structure.

9. The apparatus of claim 1, wherein the stabilizer has a shape that is complementary to a bottom portion of the vehicle.

10. The apparatus of claim 1, further comprising:
at least one static arm connected on a first end portion to the frame, the static arm extending away from the frame in a manner chosen to stabilize the vehicle when the vehicle is in at least partial contact with the interior portion of the static arm.

11. The apparatus of claim 1, further comprising a shock absorber attached to an interior portion of the apparatus.

12. The apparatus of claim 1, wherein the frame is positioned on a moveable surface.

13. The apparatus of claim 1, wherein a moveable portion and the frame is configured to at least partially contain the vehicle in the event of a systems failure on the vehicle.

14. The apparatus of claim 13, wherein the moveable portion is selected from the group consisting of a hinge, ball-joint, a rail, a gear, and an electronically controlled actuator.

15. An apparatus for stabilizing vehicles comprising:
a frame positioned on the surface;
a stabilizer connected to the frame, the stabilizer being configured to stabilize a vehicle while in at least partial contact with the vehicle while the vehicle is stationary or in motion; and
a shock absorber connected to the stabilizer and positioned to contact the vehicle; and
at least one pad connected to the apparatus.

16. The apparatus of claim 15, further comprising:
a shock absorber connected to the stabilizer and the pad configured to enable the pads to move in at least one axis with respect to the stabilizer.

* * * * *